US012794843B2

(12) United States Patent
Gandhi et al.

(10) Patent No.: US 12,794,843 B2
(45) Date of Patent: Nov. 10, 2026

(54) SYSTEM AND METHOD FOR DISPLAYING AND FILTERING MEDIA CONTENT IN A MESSAGING CLIENT

(71) Applicant: YAHOO ASSETS LLC, Dulles, VA (US)

(72) Inventors: Kaivalya Niranjan Gandhi, San Francisco, CA (US); Isaac Bradshaw, Los Gatos, CA (US); Chima Onyekwere, Brooklyn, CA (US); Nirmal Thangaraj, Milpitas, CA (US); Davis Thomas, San Jose, CA (US); Suraj Upreti, Toronto (CA); Miodrag Kekic, Mountain View, CA (US)

(73) Assignee: YAHOO ASSETS LLC, New York, NY (US)

( * ) Notice: Subject to any disclaimer, the term of this patent is extended or adjusted under 35 U.S.C. 154(b) by 27 days.

(21) Appl. No.: 19/018,054

(22) Filed: Jan. 13, 2025

(65) Prior Publication Data

US 2025/0150421 A1 May 8, 2025

Related U.S. Application Data

(63) Continuation of application No. 18/151,368, filed on Jan. 6, 2023, now Pat. No. 12,199,932.

(51) Int. Cl.
*H04L 51/212* (2022.01)

(52) U.S. Cl.
CPC .................................. *H04L 51/212* (2022.05)

(58) Field of Classification Search
CPC ..................................................... H04L 51/212
USPC ........................................................... 709/206
See application file for complete search history.

(56) References Cited

U.S. PATENT DOCUMENTS

2021/0342785 A1* 11/2021 Mann ...................... G06F 40/18
2021/0406836 A1* 12/2021 Bar-on .................. G06F 40/205

FOREIGN PATENT DOCUMENTS

WO WO-2014144356 A2 * 9/2014 ......... G06Q 30/0206

* cited by examiner

*Primary Examiner* — Lan Dai T Truong
(74) *Attorney, Agent, or Firm* — James J. DeCarlo; Greenberg Traurig, LLP

(57) ABSTRACT

In some aspects, the techniques described herein relate to a method including: receiving a set of messages; filtering the set of messages to identify a set of newsletters in response to a selection of a newsletter control within a messaging application; rendering a newsletter view within the messaging application, the newsletter view displaying a plurality of tiles corresponding to the set of newsletters; receiving a section of a given tile in the plurality of tiles from a user; and rendering a newsletter reader view, the newsletter reader view including a subject and body of a selected newsletter corresponding to the given tile.

20 Claims, 15 Drawing Sheets

SYSTEM AND METHOD FOR DISPLAYING AND FILTERING MEDIA CONTENT IN A MESSAGING CLIENT

CROSS REFERENCE TO RELATED APPLICATIONS

This application is a continuation of, and claims priority from, co-pending U.S. patent application Ser. No. 18/151,368, filed Jan. 6, 2023, entitled SYSTEM AND METHOD FOR DISPLAYING AND FILTERING MEDIA CONTENT IN A MESSAGING CLIENT, the contents of which is hereby incorporated by reference.

BACKGROUND

Email and digital messaging have become integral parts of modern communication and are used for a wide range of purposes, including personal communication, business communication, and the distribution of newsletters and other marketing materials. However, the fact that digital messages are used for such a diverse range of purposes can also make it challenging to effectively manage and organize the different types of content that are received.

For example, one technical difficulty in this regard is the fact that newsletters and other types of actionable or educational content from entities (like publications or independent creators) are often delivered via email (or similar messaging platforms) alongside more personal messages from individuals and receipts or promotions from merchants. This can make it difficult for messaging systems to distinguish between these different types of content from different sender categories and treat them appropriately. For example, a system might have rules in place to automatically sort receipts into a separate folder, but if a newsletter sender also sends a receipt or invoice (such as when a user purchases a subscription to the digital publication), it may be difficult for the system to classify it accurately and render the content appropriately.

Another technical challenge is the fact that newsletters and similar materials may have characteristics similar to, but different from, personal messages and receipts, such as subject lines and sender addresses. This can make it difficult for messaging systems to accurately classify these messages and separate them from more personal content.

Overall, the technical challenges associated with managing and organizing different types of content in a messaging system highlight the importance of technical solutions for effectively managing and organizing message content.

DETAILED DESCRIPTION

Figure 1:
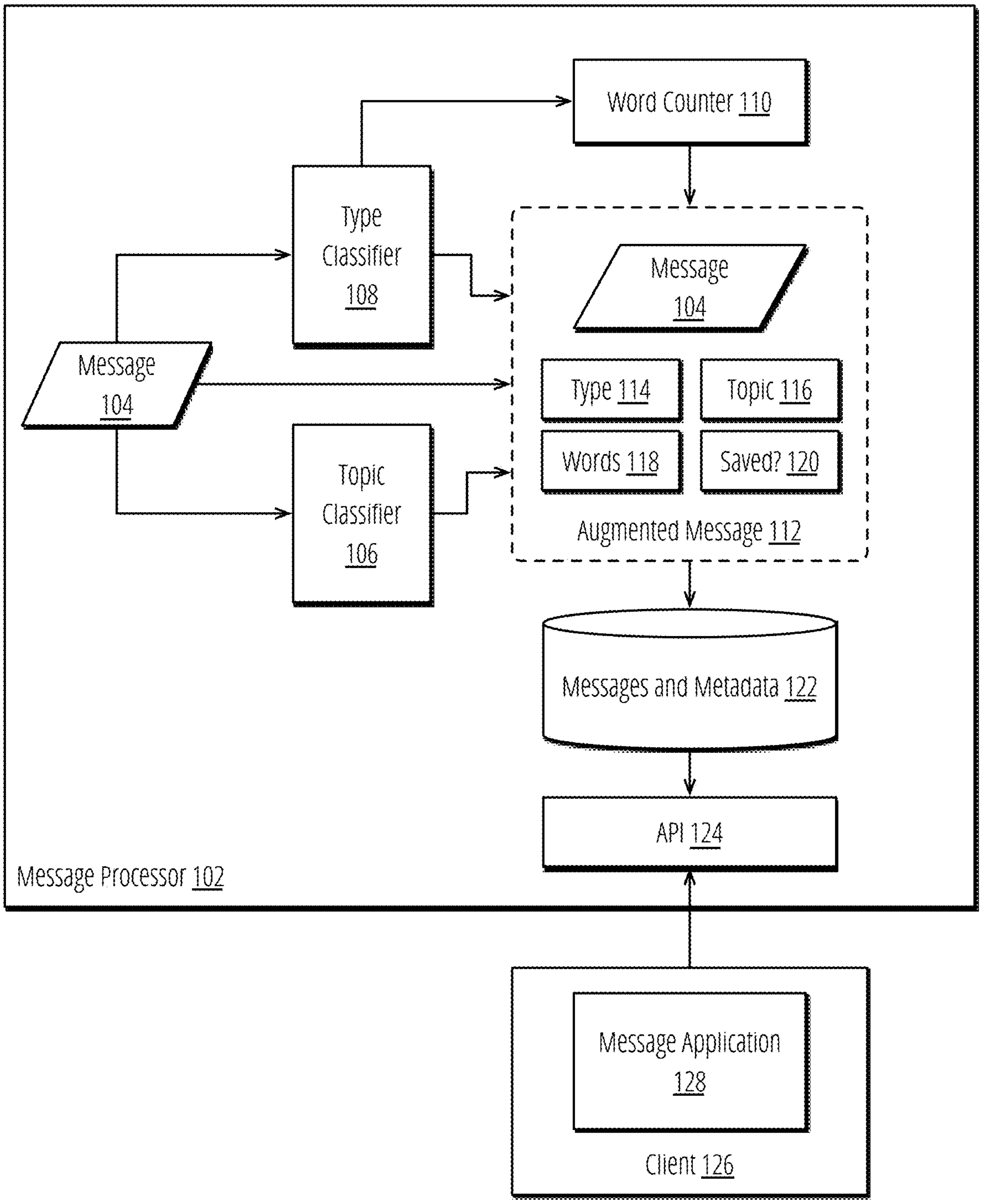
FIG. 1 is a block diagram of a system for managing messages.

The example embodiments describe messaging applications and, specifically, newsletter-specific views within such messaging applications.

The example embodiments provide a specialized view within a messaging application that is built specifically for aggregating newsletters (and similar content) and giving the user the tools to filter the newsletter emails by topic (e.g., finance, food, sports, etc.). In some implementations, a reading time estimate is surfaced next to the description of each newsletter message, which gives the user valuable insight into how long it will take to read the email. In some implementations, the views allow for bookmarking of newsletter messages, saving them to a "Reading List" (which the user can return to at any time and read) with the ability for the system to automatically "clean up" the reading list by archiving items older than a predefined time period. In some implementations, the views can include a progress bar at the bottom of the message open page, which shows how far along the user is in reading that newsletter. In some implementations, the user may seamlessly scroll to the next newsletter article by scrolling at the end or by clicking the progress bar. In some implementations, the example embodiments include a discovery view for contextual recommendations that help users discover newsletters that they could sign up for based on the content they open and add to their reading list.

In some aspects, the techniques described herein relate to a method including receiving a set of messages; filtering the set of messages to identify a set of newsletters in response to a selection of a newsletter control within a messaging application; rendering a newsletter view within the messaging application, the newsletter view displaying a plurality of tiles corresponding to the set of newsletters; receiving a section of a given tile in the plurality of tiles from a user; and rendering a newsletter reader view, the newsletter reader view including a subject and body of a selected newsletter corresponding to the given tile.

In some aspects, the techniques described herein relate to a method wherein each tile in the plurality of tiles includes a sender of a corresponding newsletter, a subject of the corresponding newsletter, an estimated reading time of the corresponding newsletter, and a save control.

In some aspects, the techniques described herein relate to a method, further including receiving an interaction with the save control and updating a saved flag associated with the corresponding newsletter to indicate that the corresponding newsletter should be saved in a reading list.

In some aspects, the techniques described herein relate to a method, further including displaying a reading list control within the messaging application, receiving a selection of the reading list control, and further filtering the set of newsletters based on save flags of the set of newsletters.

In some aspects, the techniques described herein relate to a method, further including displaying a categories control within the messaging application, the categories control displaying a set of categories.

In some aspects, the techniques described herein relate to a method, further including receiving a selection of a given category in the set of categories and further filtering the set of newsletters based on the given category.

In some aspects, the techniques described herein relate to a method wherein rendering the newsletter reader view includes displaying a reading bar, the reading bar including an area that identifies an adjacent newsletter, and a progress bar indicating the reading progress of the selected newsletter.

In some aspects, the techniques described herein relate to a non-transitory computer-readable storage medium for tangibly storing computer program instructions capable of being executed by a computer processor, the computer program instructions defining steps of receiving a set of messages; filtering the set of messages to identify a set of newsletters in response to a selection of a newsletter control within a messaging application; rendering a newsletter view within the messaging application, the newsletter view displaying a plurality of tiles corresponding to the set of newsletters; receiving a section of a given tile in the plurality of tiles from a user; and rendering a newsletter reader view, the newsletter reader view including a subject and body of a selected newsletter corresponding to the given tile.

In some aspects, the techniques described herein relate to a non-transitory computer-readable storage medium, wherein each tile in the plurality of tiles includes a sender of a corresponding newsletter, a subject of the corresponding newsletter, an estimated reading time of the corresponding newsletter, and a save control.

In some aspects, the techniques described herein relate to a non-transitory computer-readable storage medium, the steps further including receiving an interaction with the save control and updating a saved flag associated with the corresponding newsletter to indicate that the corresponding newsletter should be saved in a reading list.

In some aspects, the techniques described herein relate to a non-transitory computer-readable storage medium, the steps further including displaying a reading list control within the messaging application, receiving a selection of the reading list control, and further filtering the set of newsletters based on save flags of the set of newsletters.

In some aspects, the techniques described herein relate to a non-transitory computer-readable storage medium, the steps further including displaying a categories control within the messaging application, the categories control displaying a set of categories.

In some aspects, the techniques described herein relate to a non-transitory computer-readable storage medium, the steps further including receiving a selection of a given category in the set of categories and further filtering the set of newsletters based on the given category.

In some aspects, the techniques described herein relate to a non-transitory computer-readable storage medium, wherein rendering the newsletter reader view includes displaying a reading bar, the reading bar including an area that identifies an adjacent newsletter and a progress bar indicating a reading progress of the selected newsletter.

In some aspects, the techniques described herein relate to a device including: a processor; and a storage medium for tangibly storing thereon logic for execution by the processor, the logic including instructions for: receiving a set of messages, filtering the set of messages to identify a set of newsletters in response to a selection of a newsletter control within a messaging application, rendering a newsletter view within the messaging application, the newsletter view displaying a plurality of tiles corresponding to the set of newsletters, receiving a section of a given tile in the plurality of tiles from a user, and rendering a newsletter reader view, the newsletter reader view including a subject and body of a selected newsletter corresponding to the given tile.

In some aspects, the techniques described herein relate to a device, wherein each tile in the plurality of tiles includes a sender of a corresponding newsletter, a subject of the corresponding newsletter, an estimated reading time of the corresponding newsletter, and a save control.

In some aspects, the techniques described herein relate to a device, the instructions further including receiving an interaction with the save control and updating a saved flag associated with the corresponding newsletter to indicate that the corresponding newsletter should be saved in a reading list.

In some aspects, the techniques described herein relate to a device, the instructions further including displaying a reading list control within the messaging application, receiving a selection of the reading list control, and further filtering the set of newsletters based on save flags of the set of newsletters.

In some aspects, the techniques described herein relate to a device, the instructions further including displaying a categories control within the messaging application, the categories control displaying a set of categories.

In some aspects, the techniques described herein relate to a device, wherein rendering the newsletter reader view includes displaying a reading bar, the reading bar including an area that identifies an adjacent newsletter and a progress bar indicating the reading progress of the selected newsletter.

FIG. 1 is a block diagram of a system for managing messages.

The illustrated system includes a client 126 communicatively coupled to a message processor 102. In some implementations, a client 126 can comprise a desktop computer, laptop computer, mobile phone, tablet, or any similar type of computing device. Similarly, message processor 102 may comprise a server or multiple servers in a centralized computing environment. In some implementations, some or all components or features of message processor 102 may be implemented as containerized services or virtual machines. Examples of such computing devices are provided in the description of FIG. 8 and are not included herein.

Client 126 includes a message application 128. In some implementations, message application 128 may be a mobile application, while in other implementations, message application 128 may be a desktop application or another form of compiled binary. In yet other implementations, the message application 128 may be a web-based application implemented via, for example, Hypertext Markup Language (HTML), JavaScript, cascading stylesheets (CSS), or comparable technologies. In brief, the message application 128 can initiate communications with the message processor 102 (via, for example, an application programming interface, API 124). The message application 128 can issue requests for message content (e.g., email content) from message processor 102 and receive responsive message content from message processor 102. In some implementations, the API 124 may support various functions allowing message application 128 to query stored messages by various fields (e.g., filters), as will be discussed more herein. In some implementations, the message application 128 can display message data in various user interface (UI) screens or pages as described more fully in the descriptions that follow. Various operations of client 126 and message application 128 are described more fully in the descriptions of FIGS. 2A and 2B.

The message processor 102 includes various components for processing a raw message 104 and ultimately storing a processed message in a database 122. Various operations performed by message processor 102 are described more fully in FIG. 2C and are not repeated herein. In the following descriptions, raw message 104 may interchangeably be referred to as an electronic mail (email) message, however, the disclosure is not limited specifically to email and may use other types of digital message technologies (e.g., instant messages, social networking messages, mobile text and media messages, etc.).

Message processor 102 includes a type classifier 108 and a topic classifier 106. In an implementation, type classifier 108 is configured to receive a message and assign a type of message to the message. In some implementations, the type classifier 108 can comprise a machine learning (ML) model. In some implementations, this ML model can be a neural network, deep neural network, decision tree, or another type of classification model, such as support vector machines, random forests, and gradient boosting. In general, the type classifier 108 can be trained using a large dataset of previously labeled data, where the labels indicate the type of content that is represented by the data. The ML model can then be used to predict the type of content in new, unseen data. This can be done by providing the new data as input to the ML model, and the model will output a prediction for the type of content based on the patterns it has learned from the training data. In some implementations, the type classifier 108 may also be able to learn and adapt over time as it is exposed to more data, improving its accuracy and performance.

In some implementations, type classifier 108 may comprise a multi-label classifier that can assign one of a fixed set of labels to any message. In some implementations, one of these labels is of a "newsletter" type. In general, a newsletter refers to a message that includes longer-form readable content. In some implementations, newsletters may be sent on a periodic basis or from predictable senders. In other implementations, type classifier 108 may include a binary classifier that is specifically trained to determine whether a given message is a newsletter or not.

In message processor 102, for any message classified as a newsletter by type classifier 108, the system counts the number of words in the body of the message. In some implementations, a separate stage (word counter 110) may be used to count the number of words in a message. In other implementations, the functions of word counter 110 may be included in the type classifier 108. That is, type classifier 108 may output a classification and a number of words in the message body.

In parallel (or in sequence), topic classifier 106 receives the raw message 104 and assigns a topical category or label to the raw message 104. In some implementations, topic classifier 106 can comprise an ML model capable of classifying longer-form text (e.g., email bodies) using a precomputed or stored taxonomy. In some implementations, the topic classifier 106 can comprise a supervised ML model such as support vector machines, logistic regression, and naive Bayes classifiers. In other implementations, an unsupervised clustering algorithm can be used to cluster messages into larger clusters. In yet another embodiment, a deep learning model can be used to classify messages based on trained data classified using a pre-made taxonomy. In each embodiment, transfer learning may be used to utilize a generically trained model that is fine-tuned to the message domain. Notably, the labels predicted by topic classifier 106 may be genericized and not specific to the format of the message. Thus, topic classifier 106 may generate topics such as "Sports," "Technology," etc., that are applicable across content domains.

Message processor 102 uses the outputs of topic classifier 106, type classifier 108, and word counter 110 to generate an augmented message 112. In some implementations, augmented message 112 includes the raw message 104, the word count 118 predicted by word counter 110, the type label 114 predicted by type classifier 108, and a topic label 116 predicted by topic classifier 106. Additionally, the augmented message 112 can include a saved flag 120, which indicates whether the recipient of the raw message 104 has marked the message as saved. Initially, the saved flag 120 may be set to false and, as will be discussed, may be updated based on user interactions with the augmented message 112.

The message processor 102 stores the augmented message 112 to database 122. In some implementations, database 122 may include multiple databases or may include a single database. In some implementations, raw messages may be stored in a separate storage layer while type label 114, topic label 116, word count 118, and saved flag 120 (collectively referred to as metadata) may be stored in a separate storage layer (associated with the raw message 104 using a key or other identifier). The specific storage technologies used by database 122 are not intended to be limiting. However, in some implementations, the metadata may be separately queryable from the raw message content.

As discussed above, API 124 allows external devices to retrieve messages and metadata. API 124 also for users to update metadata, respond to messages, and perform other message functions with messages. Some of these functions are described in more detail herein. In some implementations, all functions affecting persistent data pass through API 124, while in other implementations, some functions may be performed locally.

Figure 2A:
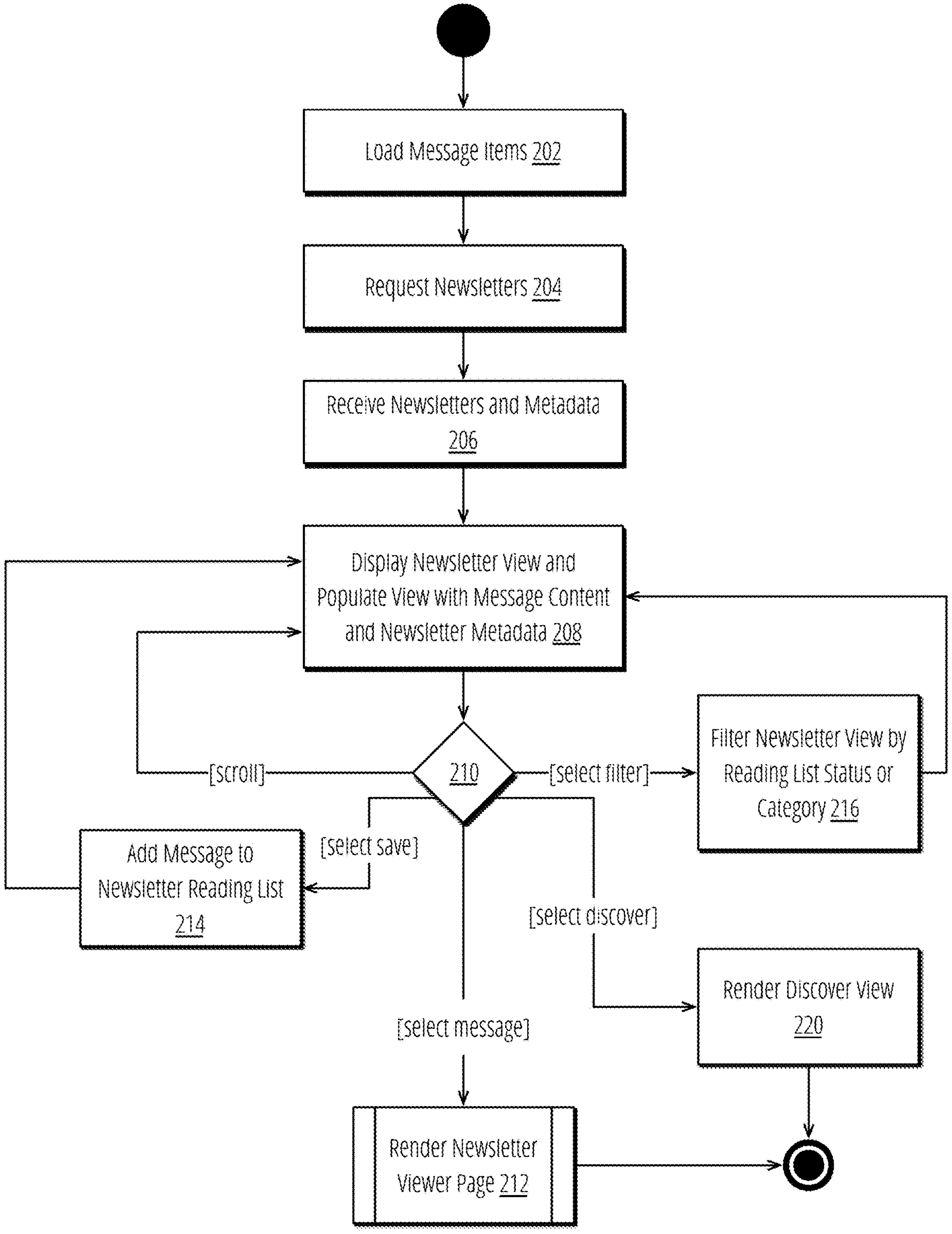
FIG. 2A is a flow diagram illustrating a method for displaying messages on a client device.

FIG. 2A is a flow diagram illustrating a method for displaying messages on a client device.

In step 202, the method can include loading message items.

Figure 3A:
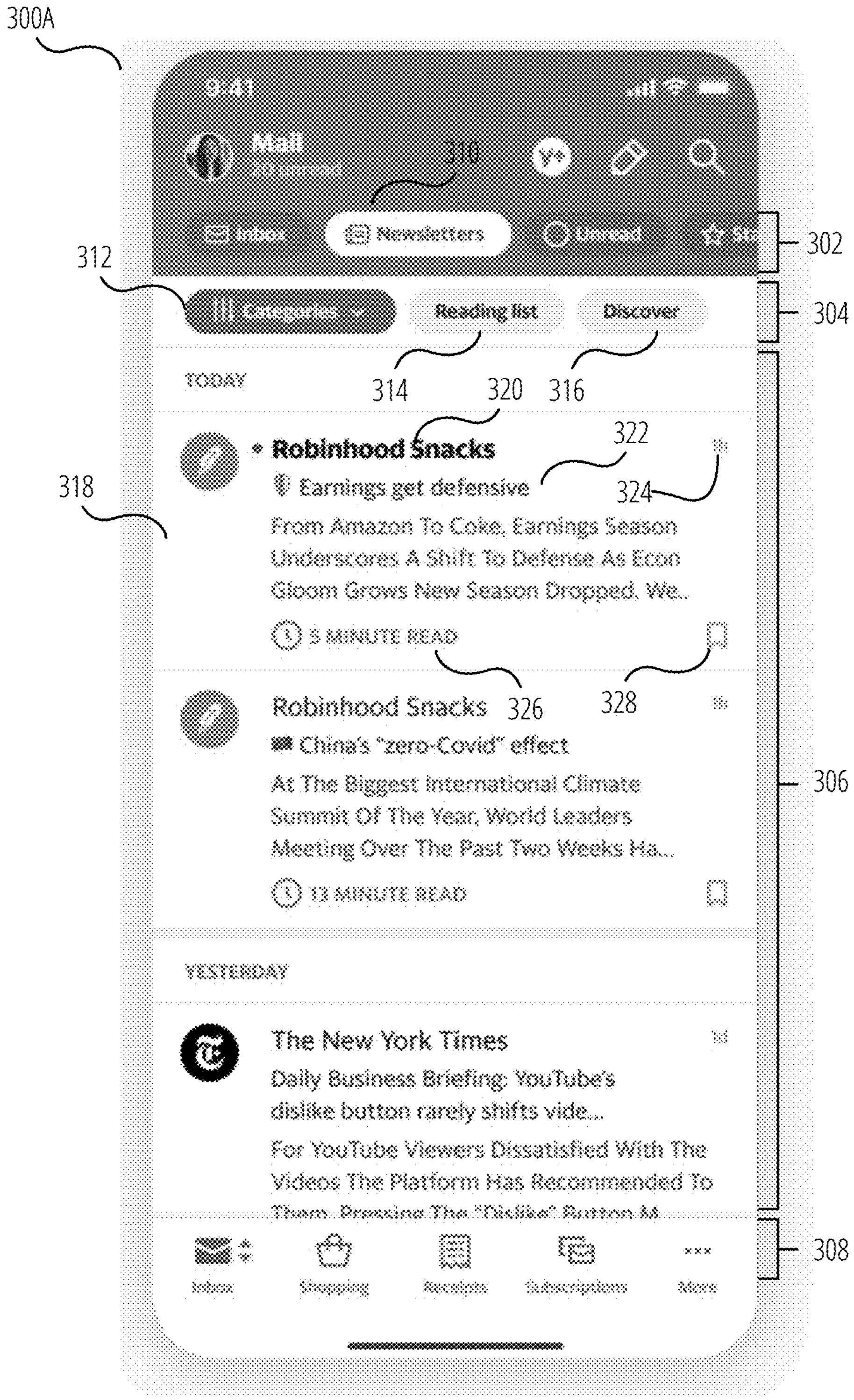
FIG. 3A is a screen diagram illustrating a newsletter view in a messaging application.
Figure 3B:
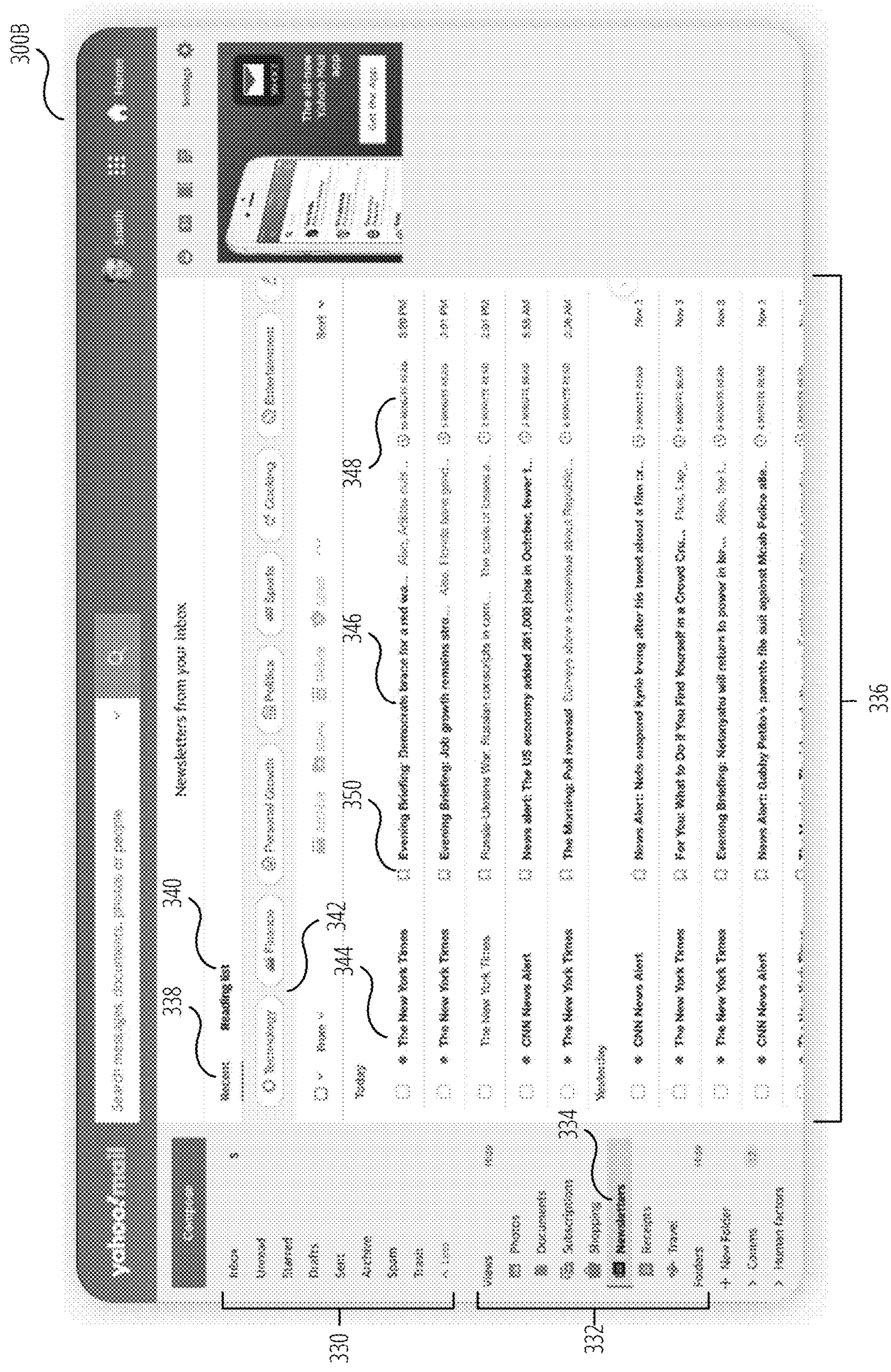
FIG. 3B is a screen diagram illustrating a desktop or web-based interface of a messaging application, including a newsletter view.

In some implementations, the method can be executed by a client device (e.g., client 126) and, specifically, a message application (e.g., message application 128) executing such a device. As illustrated in FIGS. 3A and 3B, the message application may be capable of displaying all messages (e.g., email) a user receives. As will be discussed, it may also include UI controls allowing users to filter message content.

In step 204, the method can include detecting a user's request to view newsletter messages.

In some implementations, the UI of the message application may include a UI control (e.g., button, toggle, etc.) that allows a user to view messages that were classified as having a type of "newsletter." In some implementations, the UI may update the message list to exclude any messages that are not categorized as a newsletter. For example, when requesting messages in step 202, the returned messages may include a type specifier that is not displayed but is used by the underlying storage data structure used by the message application. Thus, in step 204, this data structure can be filtered based on the newsletter type requested. Alternatively, or in conjunction with the foregoing, step 204 can also include querying a remote system (e.g., message processor 102) to return a list of newsletter messages classified by the remote system. In some implementations, the client can synchronize any local newsletter messages with the listing of remote newsletters using a consensus procedure or similar type of resolution procedure to obtain a canonical list of newsletter messages.

In step 206, the method can include receiving newsletter messages and metadata. In some implementations, this step may be optional if all newsletters and messages are stored locally. However, in implementations where newsletter data is retrieved from a remote store, the method receives this data in step 206 and synchronizes (if necessary) with any local data.

In step 208, the method can include displaying a newsletter view and populating the newsletter view with message content and newsletter metadata. Various details of a newsletter view are described with respect to FIGS. 3A through 5 and 7A through 7B and are not repeated herein. In brief, the message application may display a newsletter view or page that includes only those messages categorized as a newsletter. In some implementations, this view can include a brief summary of each categorized message and include newsletter-specific metadata in the view. For example, the view can provide an estimated read time (computed based on the word count), a control for saving the newsletter to a reading list, and other UI elements, as will be discussed.

Once the message application displays the newsletter content, it awaits user input in step 210. As illustrated, the newsletter view may support various types of interactions.

In a first interaction, the user can scroll through the newsletter view. In response, the newsletter view will update the currently displayed newsletters based on the scroll distance and the currently displayed newsletters.

In a second interaction, the user can select the newsletter message (e.g., by tapping, clicking, etc.). In response, in step 212, the method can include rendering a newsletter viewer page using the content of the newsletter and its associated metadata. Details of step 212 are provided in FIG. 2B and not repeated herein.

In a third interaction, the user can select a save control directly from the newsletter view. As illustrated in more detail in FIG. 5, each newsletter displayed can include a control allowing users to quickly add a newsletter to a saved list or reading list. In response, the message application can, in step 214, include updating the metadata of the newsletter indicating as such. In some implementations, the method can include issuing a network request to a remote computing device (e.g., message processor 102) to persist this change in a remote database. Alternatively, or in conjunction with the foregoing, a local reading list may be maintained and updated in a similar manner.

Figure 4A:
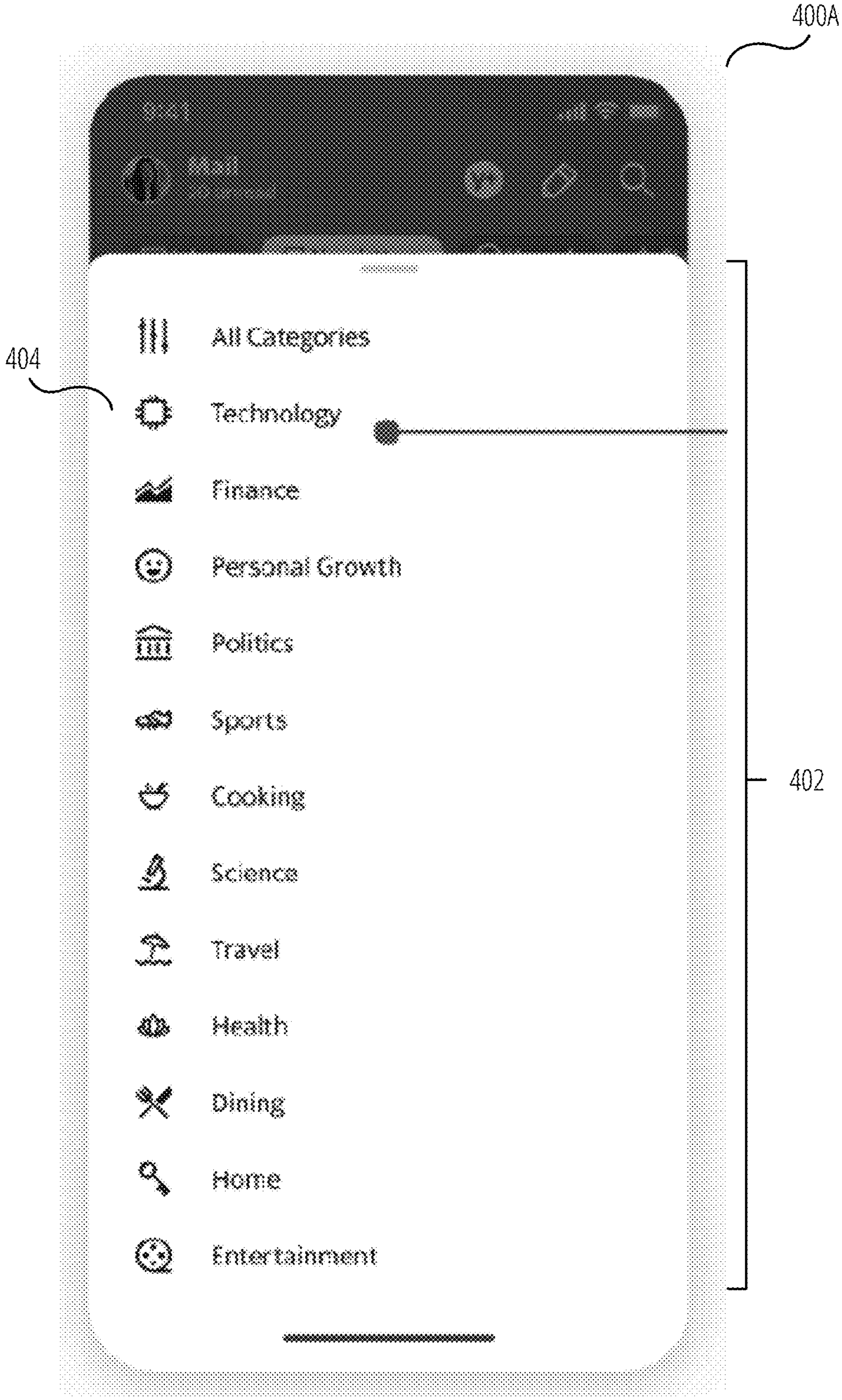
FIG. 4A is a screen diagram illustrating a view of a messaging application after the user interacts with a categories control.
Figure 4B:
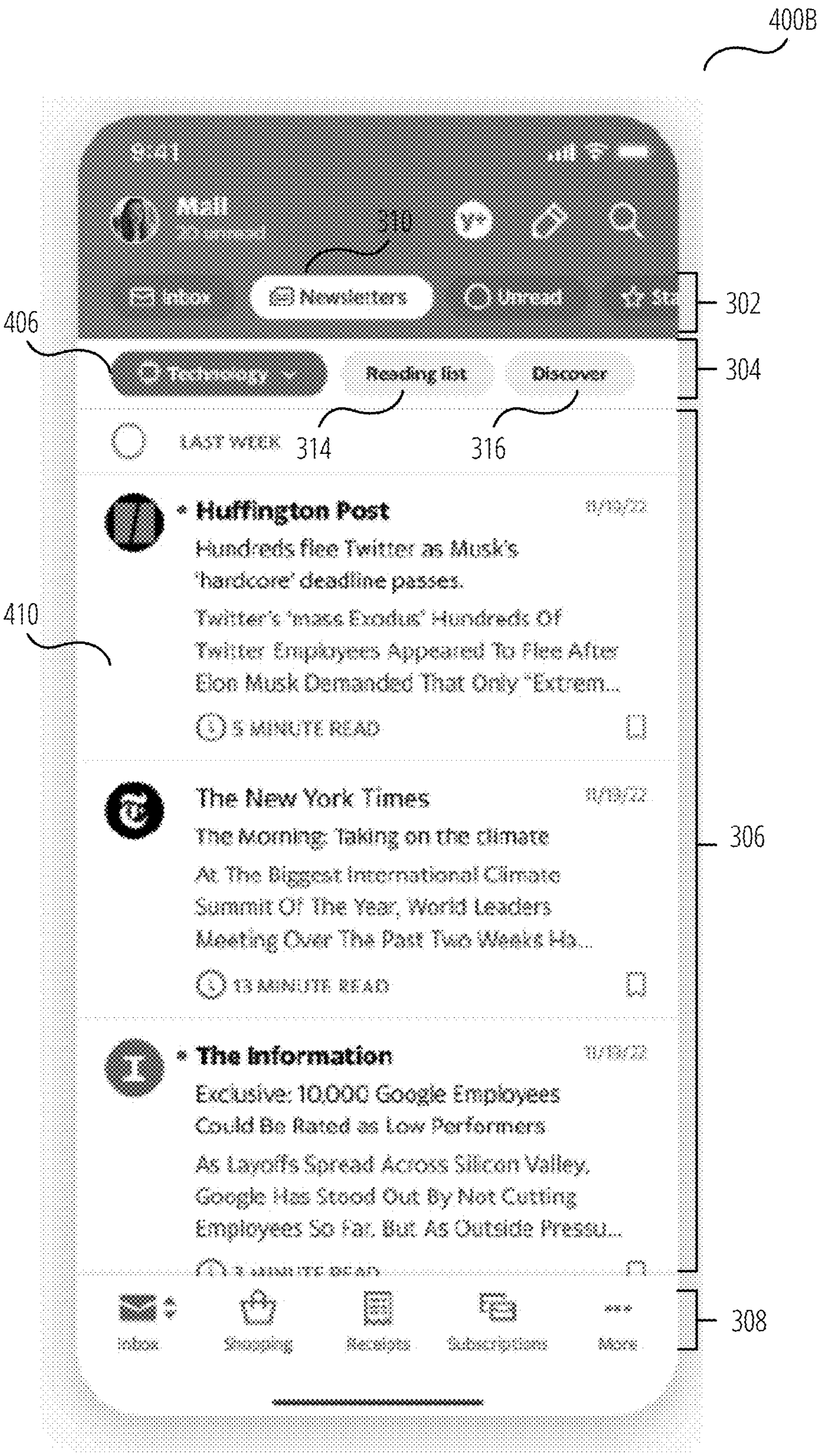
FIG. 4B is a screen diagram illustrating a filtered newsletter view.

In a fourth interaction, the user may select a filter option. In response, in step 216, the method can include filtering the newsletter view by one or more of a saved status or a category. As illustrated in FIGS. 4A through 4B, the newsletter view can include various category UI toggles that allow the newsletter view to further refine the displayed messages to only those having a specific category (e.g., as categorized by topic classifier 106). This filtering may be done locally or by querying a remote data source (or both), similar to that described with respect to step 202 through step 206. In addition to categorical filters, the method can include filtering newsletters based on whether they have been saved by the user in a reading list or saved list. In some implementations, the method can include issuing a query to a remote source for all of a user's newsletter messages (i.e., messages of type newsletter) that have a saved flag set to true. As with the preceding example, this operation may be done completely or partially locally and synchronized with a remote data source.

Finally, in a fifth interaction, the user may select a discover control which, in step 220, causes the message application to display a discover view. In the discover view, various newsletters not associated with the user can be displayed. In some implementations, the contents of the discover view may be tailored based on newsletters the user has previously read and/or saved. Details on the discover view are provided in FIGS. 7A and 7B and are not repeated herein.

Figure 2B:
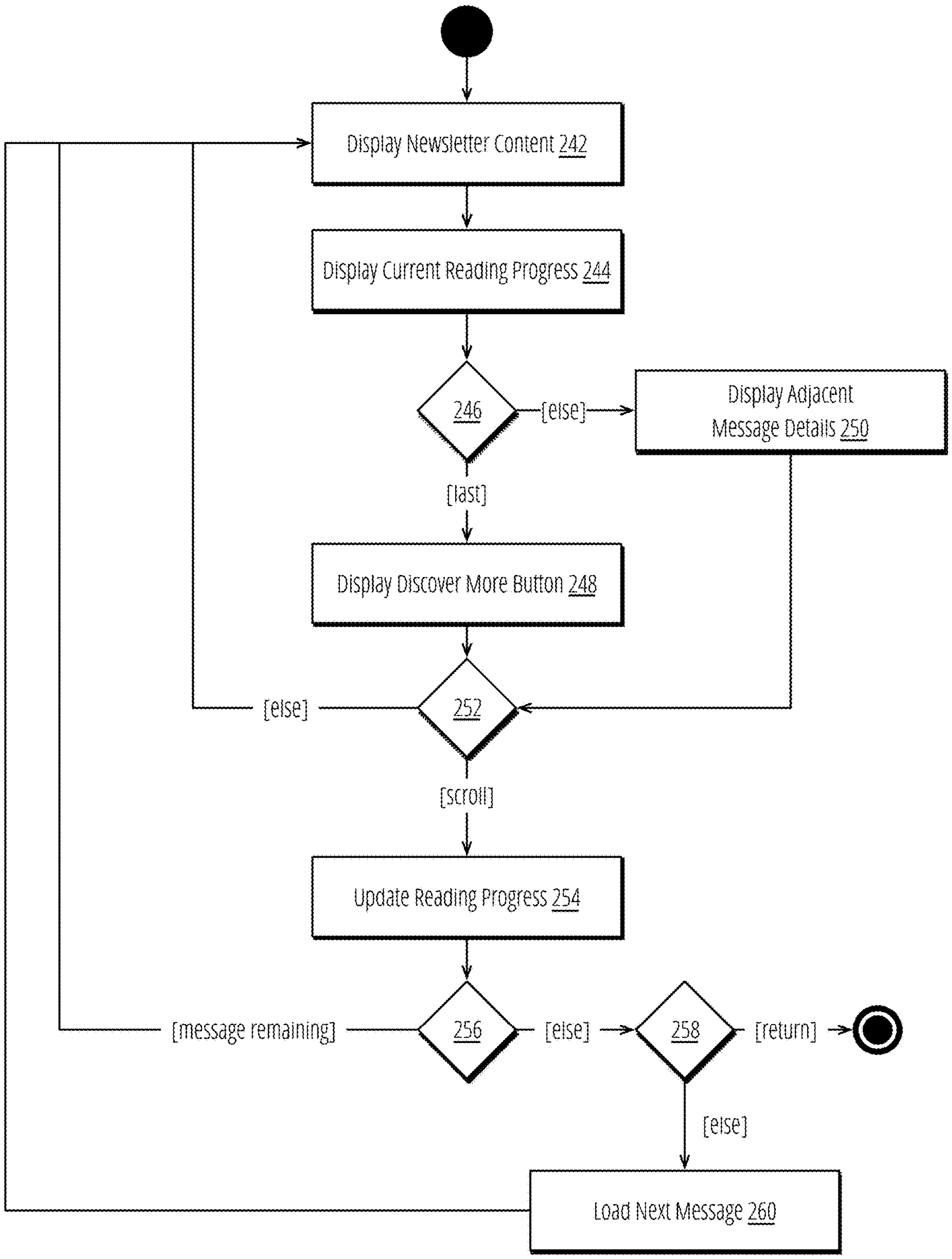
FIG. 2B is a flow diagram illustrating a method for displaying a message on a client device.

FIG. 2B is a flow diagram illustrating a method for displaying a message on a client device.

In step 242, the method can include displaying newsletter content.

In some implementations, the method can be triggered by a user selecting a newsletter from a newsletter view (as described in FIG. 2A). In response, a message application can load the corresponding newsletter content (e.g., subject, sender, body, etc.) and render a display of the newsletter content as well as various newsletter-specific controls described herein. In some implementations, step 242 can include displaying only a single newsletter message.

In step 244, the method can include displaying a current reading progress. In some implementations, the current reading progress can be computed locally by comparing the position of the screen relative to a total height of the screen. In other embodiments, this can be converted into determining a word position (e.g., the last rendered word) and determining its position in the message body and using this position as the current reading process. In some implementations, when a newsletter message is first rendered, the current reading progress may be set to zero or another initial value (e.g., the last displayed word).

Figure 6A:
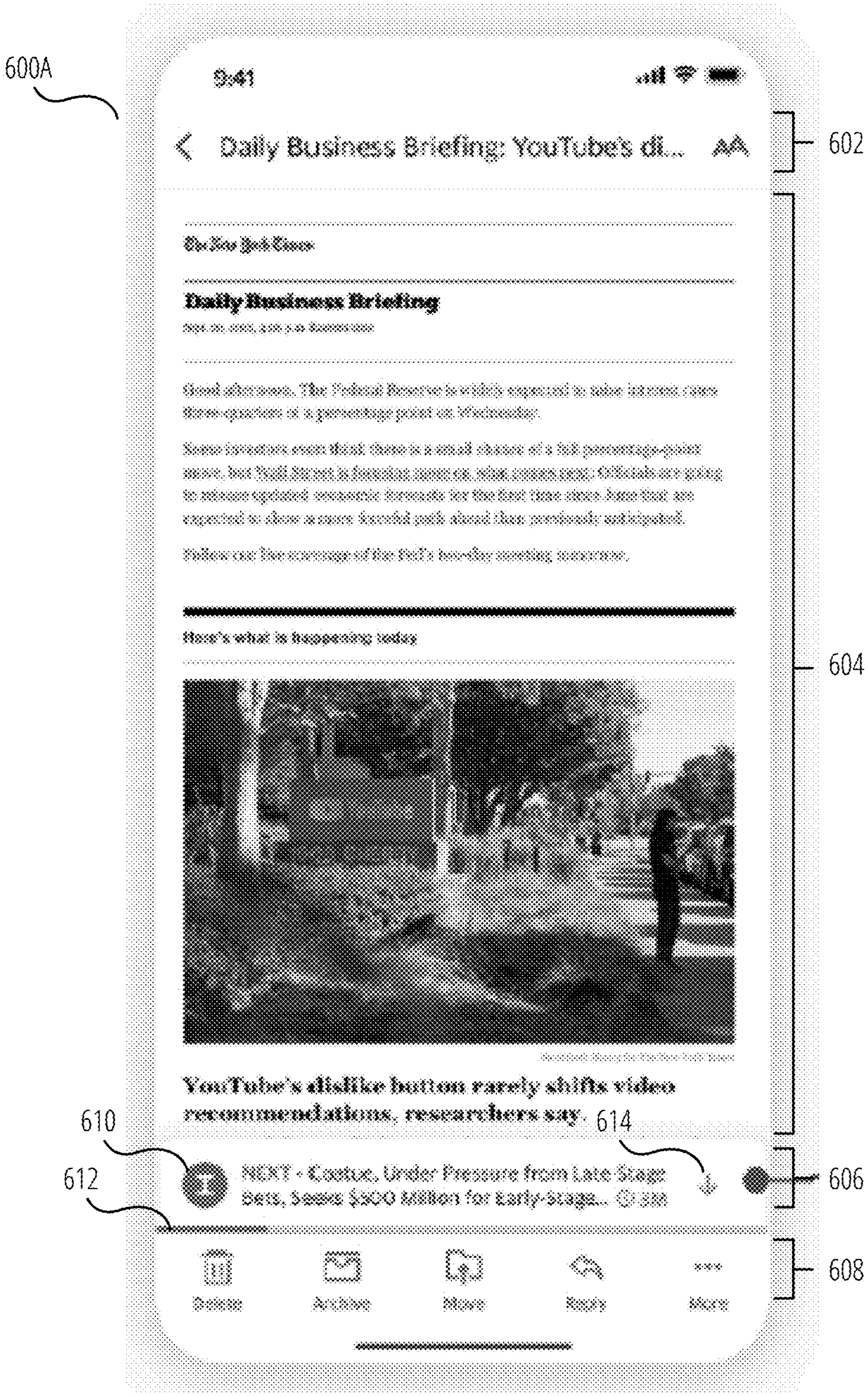
FIG. 6A is a screen diagram illustrating a newsletter reader view.
Figure 6B:
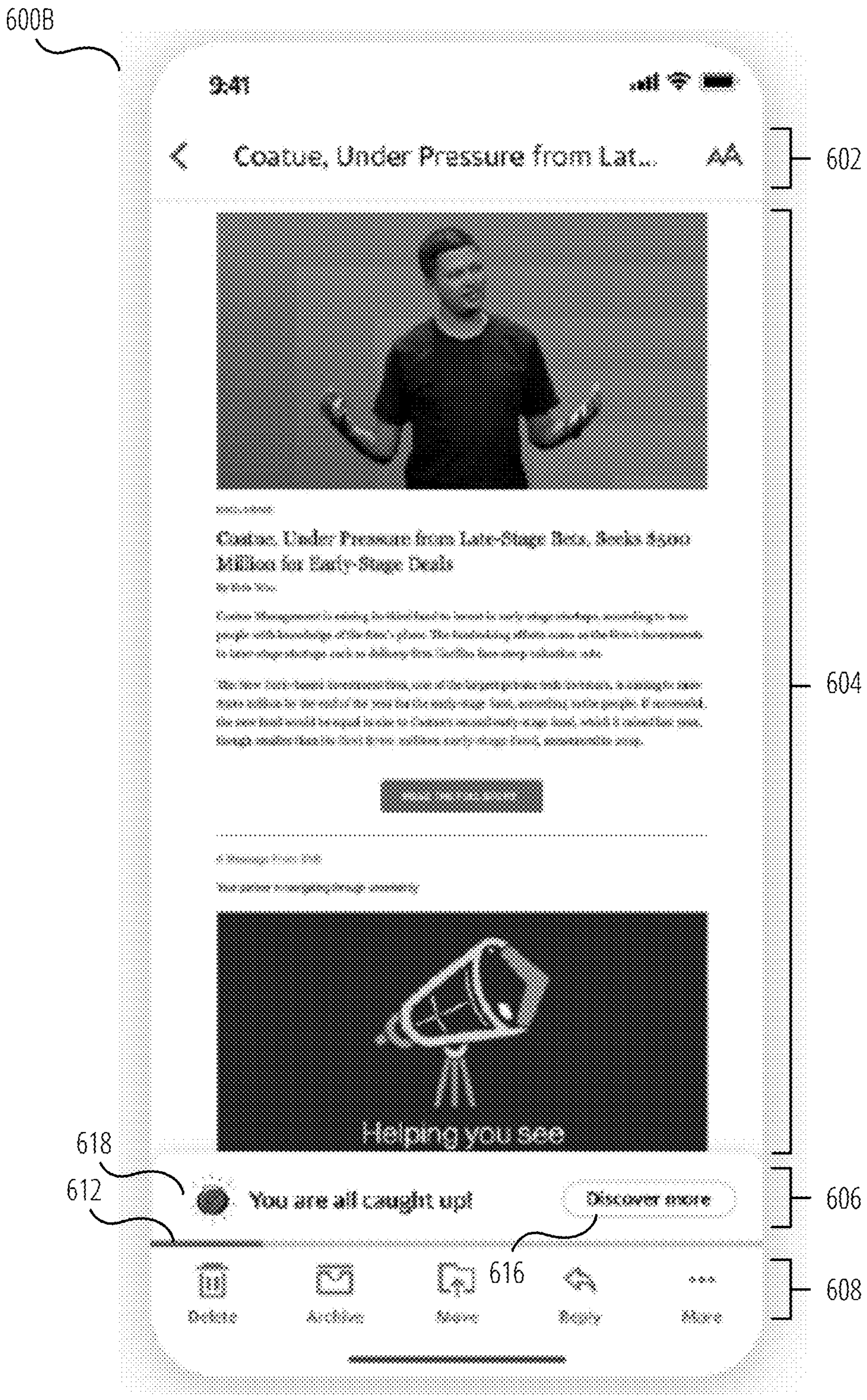
FIG. 6B is a screen diagram illustrating a newsletter reader view.
Figure 6C:
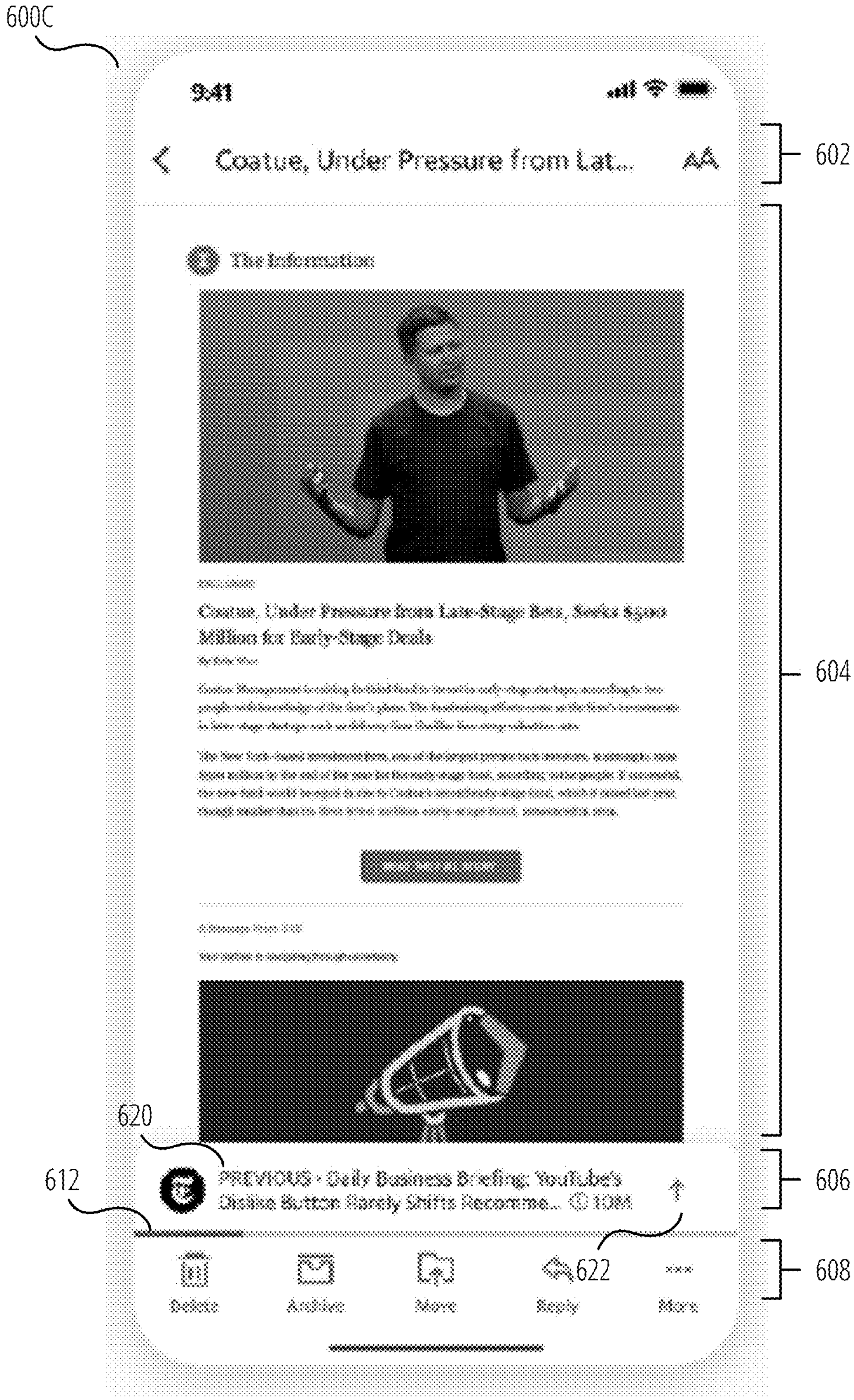
FIG. 6C is a screen diagram illustrating a newsletter reader view.

In step 246, the method can include determining the position of the current newsletter relative to other newsletters in the newsletter view that was displayed prior to step 242. As discussed and illustrated herein, the newsletter view may include multiple summaries of newsletters, and the user can select one. In some implementations, this list of newsletters can be stored as a list or array, and step 246 can include determining whether the selected newsletter is the last newsletter in the list. If the selected newsletter is not the last newsletter to read, the method (in step 250) can display adjacent message details. As illustrated in FIGS. 6A through 6C, the adjacent message details can be displayed in a separate UI control that appears below or above the message viewer. It can, in some implementations, include the title of the adjacent message, an icon of the sender, a reading time estimate, and an arrow indicating its relation to the selected newsletter. As such, the adjacent message details can include details of a newsletter preceding or succeeding the selected newsletter.

Alternatively, in some implementations, if the user is viewing the last newsletter in a list of newsletters, the method may (in step 248) display a discover control that allows a user to view new newsletters. Details of this control are depicted in FIG. 6B.

In step 252, the method can include determining if the user has scrolled the newsletter. If not, the method continues to display the current view (with content, adjacent message details, discover control, etc.) in step 242. If the user does not scroll, the reading progress may remain constant.

If, however, the user scrolls the newsletter, the method (in step 254) updates the reading progress. As discussed, this step can include determining a word position of the last displayed word and comparing this position to the total number of words. Other techniques (e.g., computing the rendered height of the article and determining the last displayed position) may be used. If the reading progress is not at, or close to or within a threshold, of 100%, the method may return to step 242, where the newsletter is still displayed. Notably, in this scenario, step 244 will include updating the reading progress UI display based on the updated reading progress in step 254 (in some implementations, step 244 may be ignored and implemented in step 254 as well to provide a more responsive UI).

However, in step 256, the method can also determine if the user is at the end of the newsletter. Determining if the user is at the end of the newsletter may include determining if the reading progress is 100% or within a threshold range (e.g., within 98%). If so, the method can determine in step 258 if another newsletter should be rendered.

In some implementations, the method can automatically load the next message by determining that a next message exists (as discussed in step 246). If so, the method can then determine if the user has kept scrolling after reaching 100% progress. If so, the method can load the next newsletter starting at step 242 and repeating the method for the next newsletter. Alternatively, or in conjunction with the foregoing, the method can determine if a user has selected the next newsletter by interacting with the adjacent message details control (e.g., tapping the next article title). If so, the method can load the next newsletter and display the next newsletter starting step 242. Alternatively, if the user exists the newsletter viewer (e.g., by selecting a back icon or swiping back, etc.), the method can terminate and return to the method of FIG. 2A to display a newsletter view.

Figure 2C:
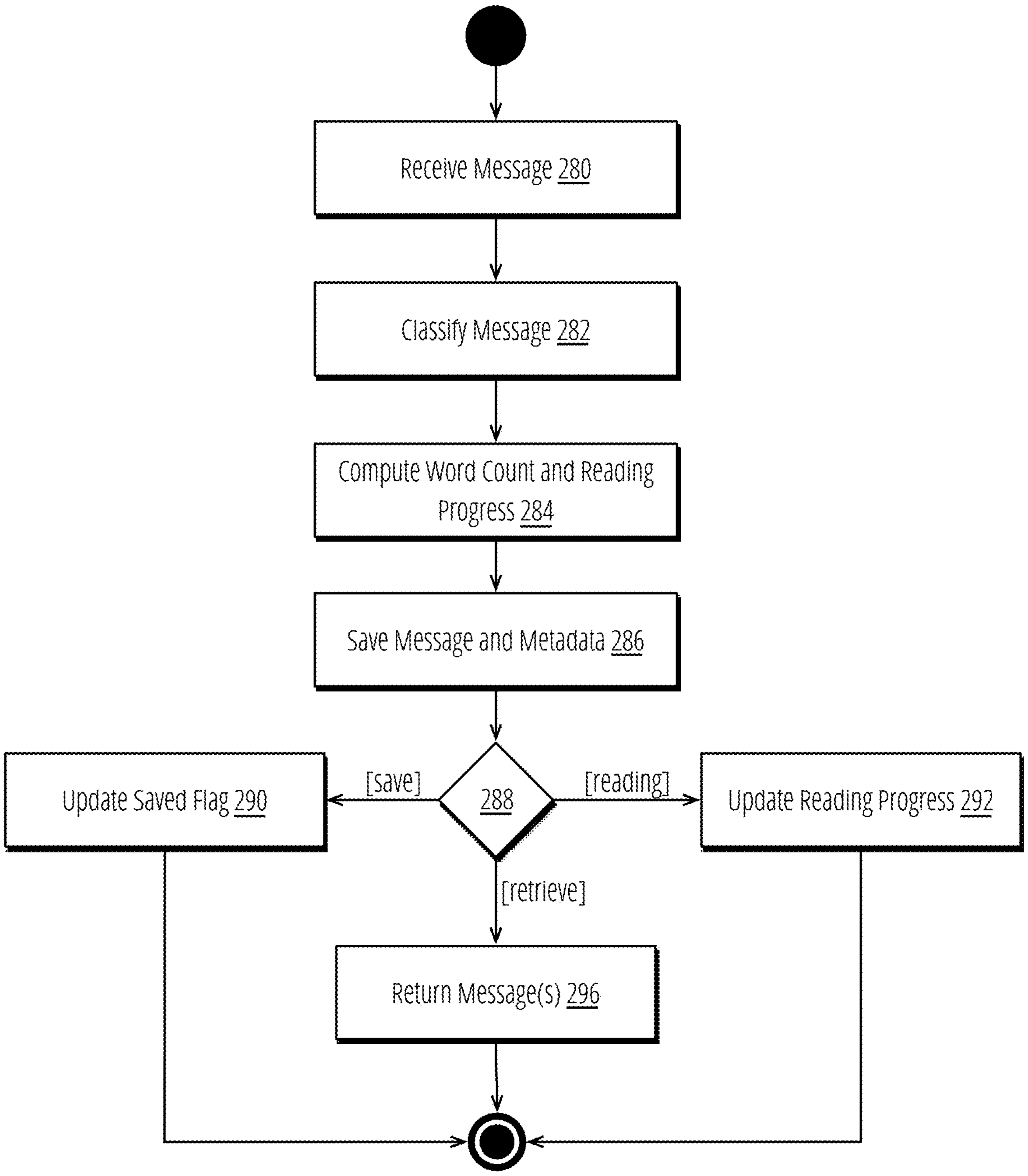
FIG. 2C is a flow diagram illustrating a method for processing raw messages at a server device.

FIG. 2C is a flow diagram illustrating a method for processing raw messages at a server device.

In step 280, the method can include receiving a message. As discussed in FIG. 1, the message may include a raw message such as an email. In some implementations, the message can include a message body. In some implementations, the message can also include a sender identifier (e.g., email address, phone number, etc.) as well as a subject line. In some implementations, the message can also include various metadata fields (e.g., time, forwarding information, recipient list, etc.).

In step 282, the method classifies the message.

In some implementations, step 282 can include assigning a type of message to the message. In some implementations, the method can utilize an ML model. In some implementations, this ML model can be a neural network, deep neural network, decision tree, or other type of classification model such as support vector machines, random forests, and gradient boosting. In general, the ML model can be trained using a large dataset of previously labeled data, where the labels indicate the type of content that is represented by the data. The ML model can then be used to predict the type of content in new, unseen data. This can be done by providing the new data as input to the ML model, and the model will output a prediction for the type of content based on the patterns it has learned from the training data. In some implementations, the ML model may also be able to learn and adapt over time as it is exposed to more data, improving its accuracy and performance. In some implementations, the ML model may comprise a multi-label classifier that can assign one of a fixed set of labels to any message. In some implementations, one of these labels is of a "newsletter" type. In general, a newsletter refers to a message that includes longer-form readable content. In some implementations, newsletters may be sent on a periodic basis or from predictable senders. In other implementations, the ML model may include a binary classifier that is specifically trained to determine whether a given message is a newsletter or not.

In step 282, the method can also include classifying the message into a category. In parallel (or in sequence), the method can assign a topical category or label to the message. In some implementations, a second ML model capable of classifying longer-form text (e.g., email bodies) using a pre-computed or stored taxonomy can be used. In some implementations, this second model can comprise a supervised ML model, such as support vector machines, logistic regression, and naive Bayes classifiers. In other implementations, an unsupervised clustering algorithm can be used to cluster messages into larger clusters. In yet another embodiment, a deep learning model can be used to classify messages based on trained data classified using a pre-made taxonomy. In each embodiment, transfer learning may be used to utilize a generically trained model that is fine-tuned to the message domain. Notably, the labels predicted by the second model may be genericized and not specific to the format of the message. Thus, the second model may generate topics such as "Sports," "Technology," etc., that are applicable across content domains.

In some implementations, a single model may be built to predict both the type and topic of a given message.

In step 284, the method can include computing a word count and the initial reading progress of the message. In some implementations, the word count can be determined by extracting a message body and counting the number of serializable terms in the message body. In some implementations, various natural language processing (NLP) techniques (e.g., stemming, lemmatization) can be used to pre-process the message body before word counting. In some implementations, stop words may also be removed before word counting. However, in other implementations, no such preprocessing may be performed. Further, in step 284, the method can include optionally setting an initial reading progress to an initial value (e.g., 0%). In other implementations, however, reading progress may only be stored locally and thus not set in step 284.

In step 286, the method can include saving the message and metadata to a database. As discussed in FIG. 1, the metadata can include a topic, type, word count, saved flag (initially set to false), reading progress status, and various other metadata fields.

In step 288, the method receives a request affecting a message. As discussed, the method may be executed by a remote computing device, and in such implementations, step 288 may include receiving a network request accessing a message to either retrieve a message (or list of messages) or update the metadata of a message.

As a first type of request, the server can receive requests to receive one or more messages. In response, the method can include returning one or more messages to the client in step 296. In some implementations, this request can include a filter specifying the conditions on the return value. For example, the filter can specify a type of "newsletter." The filter can also include a category (e.g., "Sports"). The filter can also include a saved status or read status. These filters can also be combined (e.g., return all newsletters related to Sports in a reading list). In response, the method can transmit the message content and metadata to the client device for use in a message application (described in FIGS. 2A and 2B).

The server can also receive a request to save a message to a reading list or saved list. In step 290, the method can receive an identifier of the message and update a saved flag associated with the message. The method can then save the message (in step 286), which will include the message in future queries for saved messages.

The server can also receive a request to update the reading progress of a message. In step 292, the method can receive an identifier of the message and a position of the user (as computed by the client, discussed above) for the message. The method can then save the message (in step 286), which will update the displayed reading progress in future views.

FIGS. 3A through 7B are user interface diagrams of a messaging client.

In FIG. 3A, a newsletter view 300A is depicted. As illustrated, newsletter view 300A includes various sections including a view changer 302, filter bar 304, main panel 306 and tab bar 308. Although illustrated as vertically stacked, the disclosure is not limited as such.

The view changer 302 includes various controls allowing a user to navigate to different main views of the application. As illustrated, examples of such views include, but are not limited to, an inbox view (showing all messages, ordered by, for example, time received), an unread view (showing only unread messages), and a starred view (showing only messages starred by the user). View changer 302 also includes newsletters control 310. Upon selection (e.g., tap, mouse click, etc.), newsletters control 310 causes the messaging application to display only newsletter messages. In the illustrated view, newsletter view 300A represents the view displayed after the user selects newsletters control 310.

In an implementation, the newsletter view 300A includes panels specific to newsletters (e.g., filter bar 304, main panel 306) but can also include global components (e.g., tab bar 308). For example, tab bar 308 can include similar view-based controls (e.g., shopping view, receipts view, etc.) to change the state of the messaging application.

In an implementation, filter bar 304 includes various controls to modify the newsletters shown in main panel 306. For example, filter bar 304 includes a categories control 312. In an implementation, categories control 312 causes the messaging application to filter the displayed newsletters based on a selected category. The functionality of categories control 312 is discussed in FIGS. 4A and 4B.

In an implementation, filter bar 304 includes a reading list control 314. In an implementation, the reading list control 314 causes the messaging application to filter newsletters in main panel 306 based on whether the newsletters were marked as saved by selecting, for example, a save control 328.

In an implementation, filter bar 304 includes a discover control 316. In an implementation, selection of the discover control 316 causes the messaging application to display a discover page (e.g., discover view 700D). Functional aspects of categories control 312, reading list control 314, and discover control 316 were described with respect to step 216 and step 220 of FIG. 2A.

In an implementation, main panel 306 includes a plurality of tiles that display portions of each newsletter. For example, tile 318 includes a first newsletter in a list of newsletters. Tile 318 includes a sender component 320 which includes the name of the sender, and which may or may not include an indicator indicating whether the newsletter has been opened and/or read. Tile 318 additionally includes a subject field component 322 that includes, for example, the subject of the message (e.g., email). Tile 318 further includes a snippet of the body of the message (e.g., "From Amazon to Coke . . . "). Tile 318 additionally includes a time 324 the message was sent or received. As illustrated, in some implementations, the time can be a relative time, relative to the current time. Tile 318 further includes an estimated reading time 326. As discussed above, the estimated reading time 326 may be computed based on the word count and an average reading speed. In some implementations, the estimated reading time can be tailored based on monitoring a user's reading speed. Finally, tile 318 can include a save control 328. In some implementations, the save control 328 can allow users to save newsletter from newsletter view 300A without reading a given newsletter. As discussed in FIG. 2B, main panel 306 may scrollable, displaying additional tiles in the user's inbox. Each tile may be selectable, allowing the user to read individual newsletters (as illustrated in FIGS. 6A through 6C).

FIG. 3B illustrates a desktop or web-based interface of a messaging application 300B. The functionality provided by messaging application 300B may be similar to that of the newsletter view 300A and those details are not repeated herein. Indeed, while the graphical appearance of messaging application 300B differs from newsletter view 300A, may controls have the same functionality. Specifically, selection of newsletters control 334 may cause the messaging application 300B to display a newsletter view 336 that includes similar functionality to newsletter view 300A.

In an implementation, the newsletter view 336 includes a recent control 338 that, when activated, displays all newsletters in chronological order. The newsletter view 336 also includes a reading list control 340. Selection of 340//may be similar to that of reading list control 314. Specifically, when selected, the newsletter view 336 may be updated to only include those newsletters saved in the reading list.

The newsletter view 336 further includes a category bar 342. In some implementations, the category bar includes various controls for each type of category and may be scrollable. In some implementations, if a user selects a given category control in the 342//, the newsletter view 336 may filter the newsletters to only include those newsletters categorized under the selected category.

In an implementation, in lieu of tiles, the newsletter view 336 displays newsletters as a series of rows, similar to an email client. A given row may include a sender component 344 (similar to sender component 320), subject field component 346 (similar to subject field component 322), estimated reading time 348 (similar to estimated reading time 326), and a save control 350 (similar to save control 328). Details of these components are not repeated herein.

For example, messaging application 300B includes a folder list 330 which allow the user to view different message folders that are either automatically populated or manually populated. Similar in respects to view changer 302, the folder list can include "Unread" and "Starred" folders. Messaging application 300B also includes views 332 which provide different UIs based on the type of view. As with newsletters control 310, the views 332 include a newsletters control 334 which operates similar to newsletters control 310.

FIG. 4A illustrates a view 400A of the messaging application after the user interacts with, for example, categories control 312. As illustrated, a menu 402 is displayed that includes all available categories that can be used to categorize a newsletter (or other type of message). For example, the menu 402 includes a category control 404 for the "Technology" category. As discussed, the categories in menu 402 may comprise a taxonomy of potential categories used by the backend system to categorize (e.g., assign a topic) message.

Upon selection of category control 404, the messaging application filters the newsletters shown in newsletter view 300A to obtain a filtered view 400B. The filtered view includes various elements described in FIG. 3A (e.g., view changer 302, filter bar 304, tab bar 308, main panel 306, newsletters control 310, reading list control 314, discover control 316). However, filtered view 400B has been updated to highlight the selected category in updated categories control 406. Further, the displayed newsletters have been updated to only include those in the category "Technology" (e.g., tile 410 and other tiles were previously categorized as technology newsletters).

Figure 5:
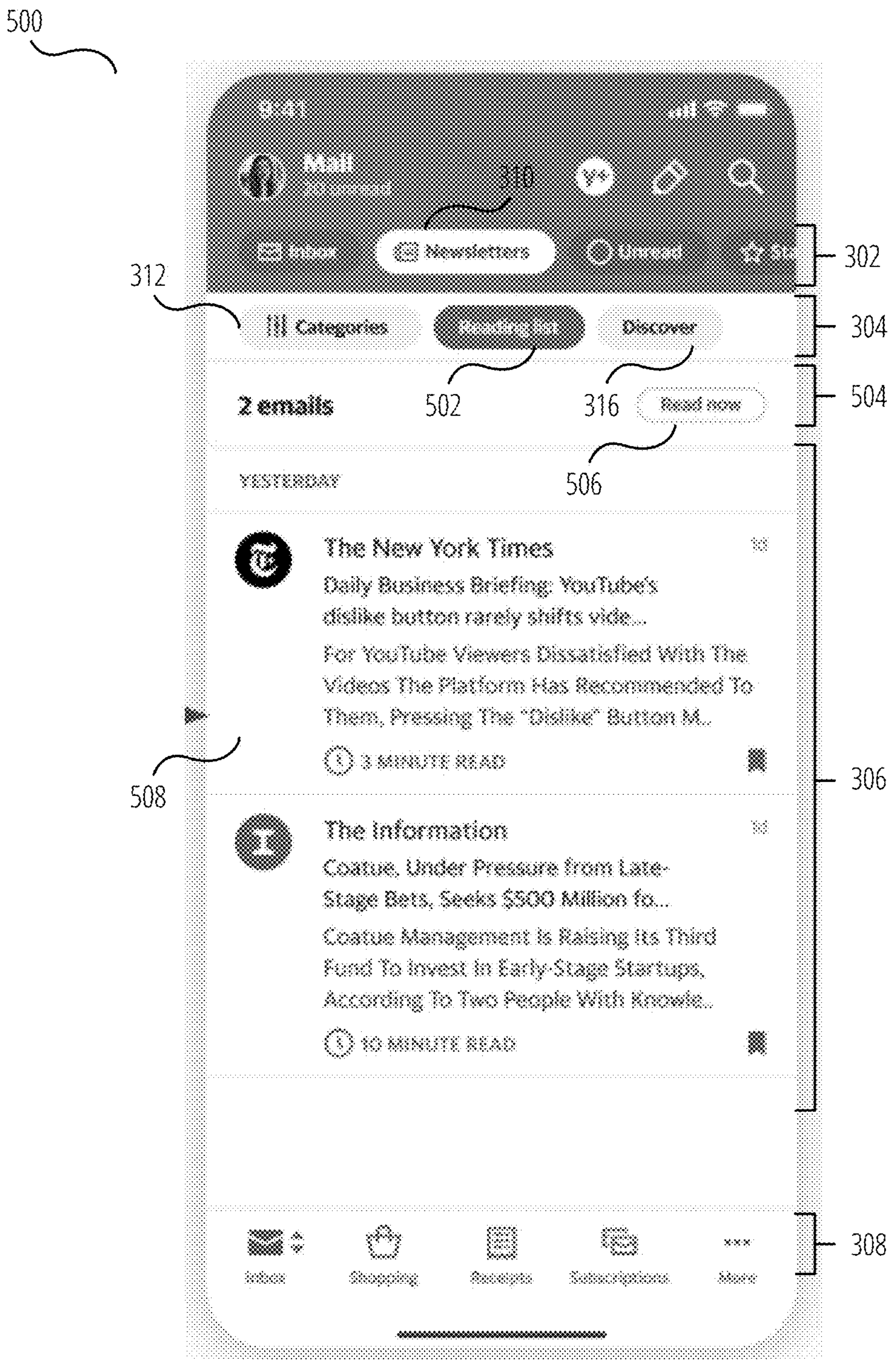
FIG. 5 is a screen diagram illustrating a reading list view.

FIG. 5 is a diagram of a reading list view.

In some implementations, view 500 may be displayed when a user selects the reading list control 314 of FIG. 3A. In response, various elements remain similar (e.g., view changer 302, filter bar 304, main panel 306, tab bar 308, newsletters control 310, categories control 312, and discover control 316) while others change or are added. For example, in filter bar 304, the reading list control 314 is highlighted to form active reading list control 502 indicating which view is being displayed. Furthermore, a panel 504 is added that summarizes the reading list ("2 emails") and provides a read now button 506 that allows a user to start reading the saved newsletters. In some implementations, selection of now button 506 results in a screen such as that in FIG. 6A to be rendered with the first saved newsletter (e.g., the newsletter in tile 508). Similarly, main panel 306 is updated to only include saved newsletters, as discussed previously.

FIG. 6A illustrates a newsletter reader view.

In some implementations, newsletter reader view 600A may be displayed when a user selects a newsletter (e.g., by selecting a newsletter tile, selecting now button 506, etc.). In general, the newsletter reader view 600A will include a subject line component 602 and a body component 604. The specific content of these components is not limited and will be rendered based on the underlying message. Further, the newsletter reader view 600A may include a message tab bar 608 which includes actions that can be performed on a message (e.g., delete, archive, move, reply, etc.).

As discussed in FIG. 2B, the messaging application displays a reading bar 606. In some implementations, the reading bar 606 can include adjacent message details as described in FIG. 2B. For example, the reading bar 606 can include an icon of the sender and a subject line or partial body in area 610. Further, reading bar 606 can include an icon 614 that indicates whether the next newsletter is before or after the currently displayed newsletter. In FIG. 6C, the newsletter is the next newsletter. Further, reading bar 606 can include a progress bar 612 that illustrate the estimated reading progress of the user, as discussed previously. As a user scrolls the newsletter in body component 604, the progress bar 612 may update accordingly. FIG. 6C illustrates an alternative scenario where icon 614 indicates that the next newsletter is a previous newsletter in the user's reading list. Likewise, area 620 is modified to indicate that the identified newsletter is a previous one.

FIG. 6B illustrates a newsletter reader view 600B of the newsletter reader view. In newsletter reader view 600B, the user has read all newsletters and/or is at the final newsletter in their saved list. In this scenario, reading bar 606 does not include a next newsletter but rather includes a notification 618 indicating the user has completed reading all newsletters as well as a control 616 allowing them to view other potential newsletters.

Figure 7A:
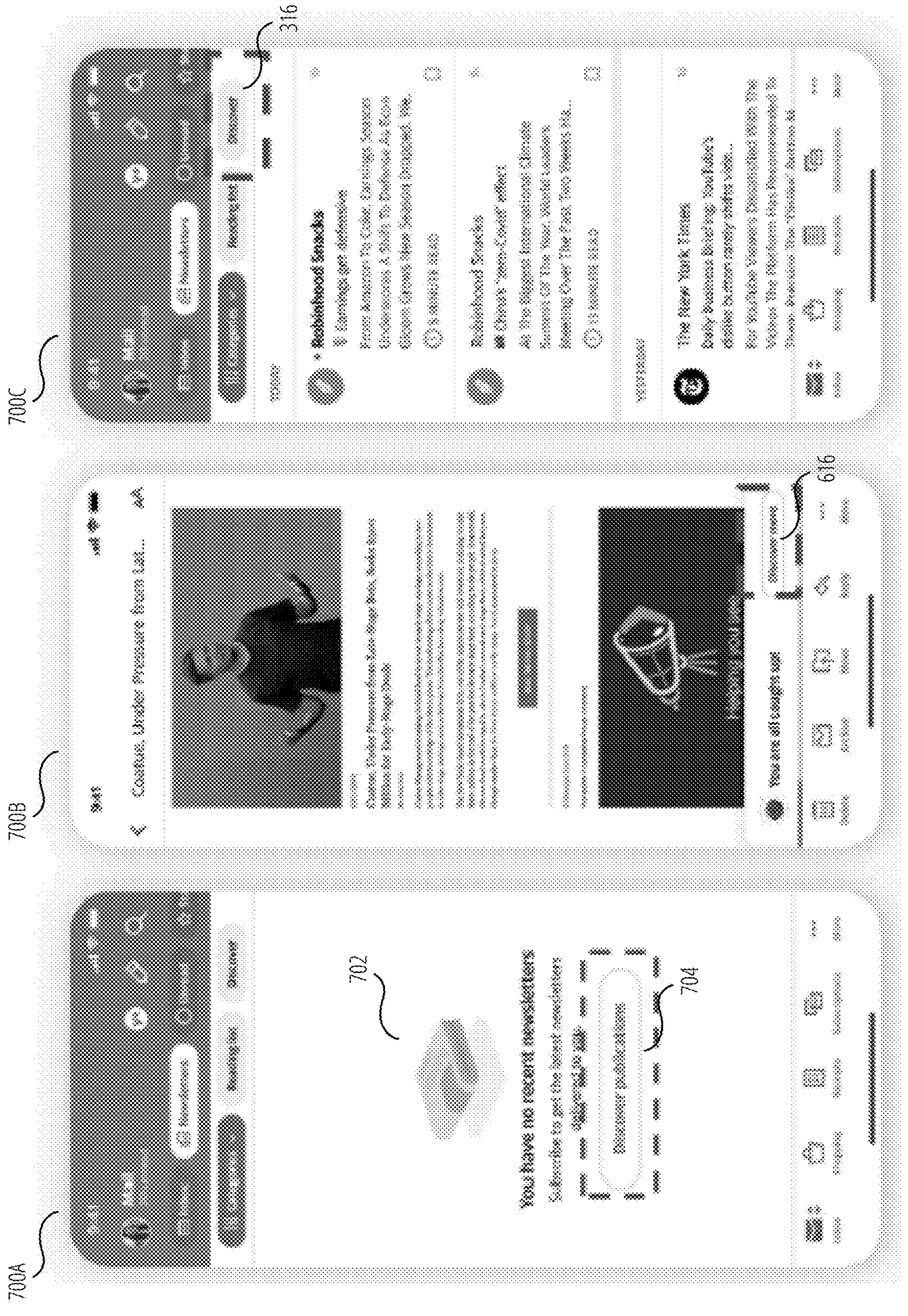
FIG. 7A is a screen diagram illustrating various views of a messaging application.
Figure 7B:
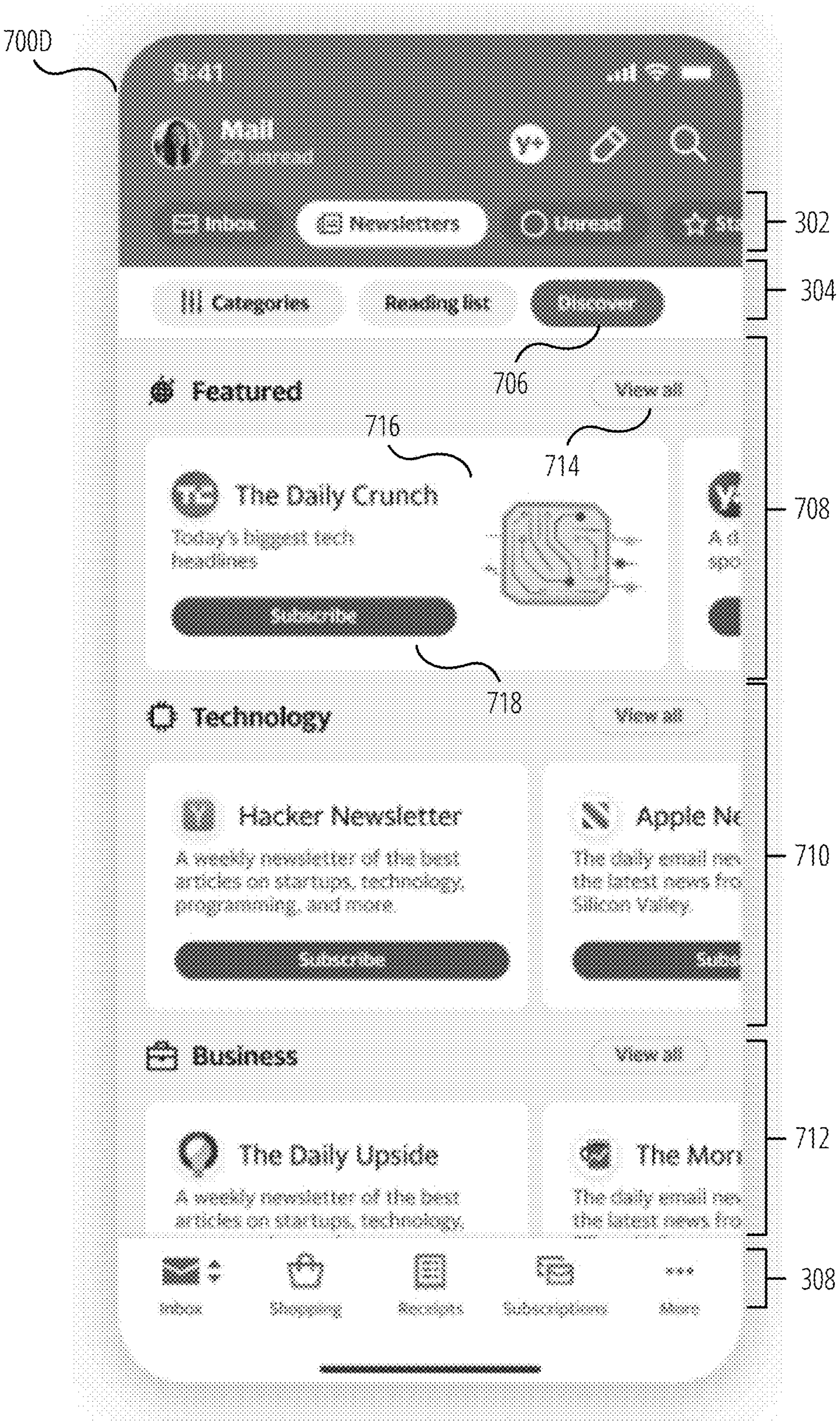
FIG. 7B is a screen diagram illustrating a discover view.

FIG. 7A illustrates various views of a messaging application, previously discussed. For example, view 700A corresponds to newsletter view 300A, albeit with an empty inbox of newsletters. View 700B corresponds to newsletter reader view 600B. View 700C corresponds to newsletter view 300A with items present. Each view includes a control to enable discovery of new newsletters. View 700A includes a graphic 702 that indicates the user's newsletter inbox is empty and a control 704 to allow the user to navigate to the discover view 700D. Further, view 700B and view 700C include control 616 and discover control 316, respectively, to allow the user to quickly navigate to the discover view 700D. In FIG. 7B, the discover view 700D is illustrated. Discover view 700D may include view changer 302 and filter bar 304 as discussed previously. In the illustrated implementation, the filter bar 304 is updated to indicate the discover page is displayed by highlighting discover control 706.

The main portion of discover view 700D includes categorical sections including featured section 708, technology section 710, and business section 712. Other sections may be displayed. In general, each section corresponds to a category of newsletter while some may comprise curated newsletter lists (E.g., featured section 708). Each section includes similar controls which are identified in the context of featured section 708. For example, a given section can include a list of newsletter tiles (e.g., tile 716) that includes the title of the newsletter, a byline, as well as a subscribe button 718. In some implementations, selection of the subscribe button 718 can cause the messaging application to submit the user's contact details (e.g., email address) to the corresponding newsletter provider. Further, each section can include a view all control 714 that allows the user to expand the list of tiles into a full list of available newsletters.

Figure 8:
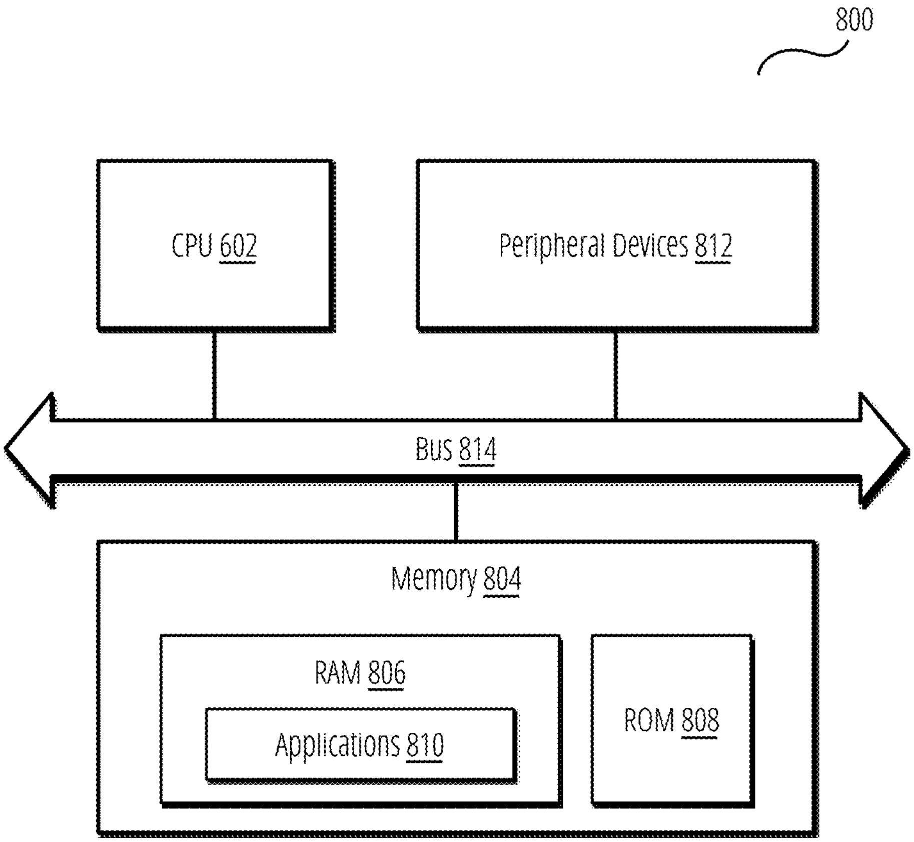
FIG. 8 is a block diagram of a computing device.

FIG. 8 is a block diagram of a computing device.

In some embodiments, the computing device 800 can be used to perform the methods described above or implement the components depicted in the foregoing figures.

As illustrated, the computing device 800 includes a processor or central processing unit (CPU) such as CPU 802 in communication with a memory 804 via a bus 814. The device also includes one or more input/output (I/O) or peripheral devices 812. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 802 may comprise a general-purpose CPU. The CPU 802 may comprise a single-core or multiple-core CPU. The CPU 802 may comprise a system-on-a-chip (SoC) or a similar embedded system. In some embodiments, a graphics processing unit (GPU) may be used in place of, or in combination with, a CPU 802. Memory 804 may comprise a non-transitory memory system including a dynamic random-access memory (DRAM), static random-access memory (SRAM), Flash (e.g., NAND Flash), or combinations thereof. In one embodiment, bus 814 may comprise a Peripheral Component Interconnect Express (PCIe) bus. In some embodiments, bus 814 may comprise multiple busses instead of a single bus.

Memory 804 illustrates an example of non-transitory computer storage media for the storage of information such as computer-readable instructions, data structures, program modules, or other data. Memory 804 can store a basic input/output system (BIOS) in read-only memory (ROM), such as ROM 808, for controlling the low-level operation of the device. The memory can also store an operating system in random-access memory (RAM) for controlling the operation of the device Applications 810 may include computer-readable and computer-executable instructions which, when executed by the device, perform any of the methods (or portions of the methods) described previously in the description of the preceding Figures. In some embodiments, the software or programs implementing the method embodiments can be read from a hard disk drive (not illustrated) and temporarily stored in RAM 806 by CPU 802. CPU 802 may then read the software or data from RAM 806, process them, and store them in RAM 806 again.

The computing device 800 may optionally communicate with a base station (not shown) or directly with another computing device. One or more network interfaces in peripheral devices 812 are sometimes referred to as a transceiver, transceiving device, or network interface card (NIC).

An audio interface in peripheral devices 812 produces and receives audio signals such as the sound of a human voice. For example, an audio interface may be coupled to a speaker and microphone (not shown) to enable telecommunication with others or generate an audio acknowledgment for some action. Displays in peripheral devices 812 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 812 may comprise any input device arranged to receive input from a user. An illuminator in peripheral devices 812 may provide a status indication or provide light. The device can also comprise an input/output interface in peripheral devices 812 for communication with external devices, using communication technologies, such as USB, infrared, Bluetooth™, or the like. A haptic interface in peripheral devices 812 provides tactile feedback to a user of the client device.

A GPS receiver in peripheral devices 812 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown in FIG. 8, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, the claimed or covered subject matter is intended to be broadly interpreted. Among other things, for example, the subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms such as "or," "and," or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, can be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur in any order other than those noted in the illustrations. For example, two blocks shown in succession can, in fact, be executed substantially concurrently, or the blocks can sometimes be executed in the reverse order, depending upon the functionality or acts involved.

These computer program instructions can be provided to a processor of a general-purpose computer to alter its function to a special purpose; a special purpose computer; ASIC; or other programmable digital data processing apparatus, such that the instructions, which execute via the processor of the computer or other programmable data processing apparatus, implement the functions or acts specified in the block diagrams or operational block or blocks, thereby transforming their functionality in accordance with embodiments herein.

For the purposes of this disclosure, a computer-readable medium (or computer-readable storage medium) stores computer data, which data can include computer program code or instructions that are executable by a computer, in machine-readable form. By way of example, and not limitation, a computer-readable medium may comprise computer-readable storage media for tangible or fixed storage of data or communication media for transient interpretation of code-containing signals. Computer-readable storage media, as used herein, refers to physical or tangible storage (as opposed to signals) and includes without limitation volatile and non-volatile, removable, and non-removable media implemented in any method or technology for the tangible storage of information such as computer-readable instructions, data structures, program modules or other data. Computer-readable storage media includes, but is not limited to, RAM, ROM, EPROM, EEPROM, flash memory or other solid-state memory technology, CD-ROM, DVD, or other optical storage, magnetic cassettes, magnetic tape, magnetic disk storage, or other magnetic storage devices, or any other physical or material medium which can be used to tangibly store the desired information or data or instructions and which can be accessed by a computer or processor.

For the purposes of this disclosure, a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer-readable medium for execution by a processor. Modules may be integral to one or more servers or be loaded and executed by one or more servers. One or more modules may be grouped into an engine or an application.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than or more than all the features described herein are possible.

Functionality may also be, in whole or in part, distributed among multiple components, in manners now known or to become known. Thus, a myriad of software, hardware, and firmware combinations are possible in achieving the functions, features, interfaces, and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example to provide a complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising:

displaying, via a messaging application executing on a computing device, a newsletter in a reader view, the reader view including a subject and body of the newsletter;

computing a reading progress of the newsletter by determining a position of a last displayed word within the body and calculating a progress percentage based on the position of the last displayed word relative to a total word count of the newsletter;

determining an end of the newsletter when the reading progress reaches a predetermined threshold percentage; and in response to reaching the end, automatically displaying an adjacent message details area that includes one or more of an icon of a sender of an adjacent newsletter, a subject line of the adjacent newsletter, and an indicator identifying whether the adjacent newsletter precedes or follows the newsletter.

2. The method of claim 1, further comprising classifying messages as newsletters using a machine learning model trained on a dataset of previously labeled messages.

3. The method of claim 2, wherein the machine learning model comprises a multi-label classifier capable of assigning one of a fixed set of labels to a message.

4. The method of claim 1, further comprising: applying a topic classification to the newsletter using a topic classifier; and rendering a category tag for the newsletter based on the topic classification.

5. The method of claim 1, wherein computing the reading progress further comprises: removing stop words from the body before calculating a word count; and applying natural language processing techniques to determine the position of the last displayed word.

6. The method of claim 1, further comprising: maintaining a saved flag associated with the newsletter; and updating the saved flag based on user interactions with the newsletter in the reader view.

7. The method of claim 1, further comprising: maintaining a discovery view within the messaging application; and populating the discovery view with newsletter recommendations based on one or more of newsletters previously opened by a user and newsletters saved to a reading list of the user.

8. The method of claim 1, further comprising rendering a progress bar in the reader view representing the reading progress, wherein the progress bar is dynamically updated in real-time as a user scrolls through the newsletter.

9. A non-transitory computer-readable storage medium for tangibly storing computer program instructions capable of being executed by a computer processor, the computer program instructions defining steps of:

displaying, via a messaging application executing on a computing device, a newsletter in a reader view, the reader view including a subject and body of the newsletter;

computing a reading progress of the newsletter by determining a position of a last displayed word within the body and calculating a progress percentage based on the position of the last displayed word relative to a total word count of the newsletter;

determining an end of the newsletter when the reading progress reaches a predetermined threshold percentage; and in response to reaching the end, automatically displaying an adjacent message details area that includes one or more of an icon of a sender of an adjacent newsletter, a subject line of the adjacent newsletter, and an indicator identifying whether the adjacent newsletter precedes or follows the newsletter.

10. The non-transitory computer-readable storage medium of claim 9, the steps further comprising classifying messages as newsletters using a machine learning model trained on a dataset of previously labeled messages.

11. The non-transitory computer-readable storage medium of claim 10, wherein the machine learning model comprises a multi-label classifier capable of assigning one of a fixed set of labels to a message.

12. The non-transitory computer-readable storage medium of claim 9, the steps further comprising: applying a topic classification to the newsletter using a topic classifier; and rendering a category tag for the newsletter based on the topic classification.

13. The non-transitory computer-readable storage medium of claim 9, wherein computing the reading progress further comprises: removing stop words from the body before calculating a word count; and applying natural language processing techniques to determine the position of the last displayed word.

14. The non-transitory computer-readable storage medium of claim 9, the steps further comprising: maintaining a saved flag associated with the newsletter; and updating the saved flag based on user interactions with the newsletter in the reader view.

15. The non-transitory computer-readable storage medium of claim 9, the steps further comprising: maintaining a discovery view within the messaging application; and populating the discovery view with newsletter recommendations based on one or more of newsletters previously opened by a user and newsletters saved to a reading list of the user.

16. The non-transitory computer-readable storage medium of claim 9, the steps further comprising rendering a progress bar in the reader view representing the reading progress, wherein the progress bar is dynamically updated in real-time as a user scrolls through the newsletter.

17. A device comprising:

a processor; and a storage medium for tangibly storing thereon program logic for execution by the processor, the program logic including steps for:

displaying, via a messaging application executing on the processor, a newsletter in a reader view, the reader view including a subject and body of the newsletter;

computing a reading progress of the newsletter by determining a position of a last displayed word within the body and calculating a progress percentage based on the position of the last displayed word relative to a total word count of the newsletter;

determining an end of the newsletter when the reading progress reaches a predetermined threshold percentage; and in response to reaching the end, automatically displaying an adjacent message details area that includes one or more of an icon of a sender of an adjacent newsletter, a subject line of the adjacent newsletter, and an indicator identifying whether the adjacent newsletter precedes or follows the newsletter.

18. The device of claim 17, the steps further comprising classifying messages as newsletters using a machine learning model trained on a dataset of previously labeled messages.

19. The device of claim 18, wherein the machine learning model comprises a multi-label classifier capable of assigning one of a fixed set of labels to a message.

20. The device of claim 17, the steps further comprising: applying a topic classification to the newsletter using a topic classifier; and rendering a category tag for the newsletter based on the topic classification.

* * * * *